(12) United States Patent
Bhogal et al.

(10) Patent No.: US 8,724,964 B2
(45) Date of Patent: May 13, 2014

(54) MANAGING MULTIPLE USER LOCKS AND DELETION REQUESTS FOR A DIGITAL VIDEO RECORDER

(75) Inventors: Kulvir Singh Bhogal, Pflugerville, TX (US); Brian M. O'Connell, Cary, NC (US); Rick A. Hamilton, II, Charlottesville, VA (US); Gregory J. Boss, American Fork, UT (US); Jeffrey D. Amsterdam, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 12/249,728

(22) Filed: Oct. 10, 2008

(65) Prior Publication Data

US 2010/0092160 A1      Apr. 15, 2010

(51) Int. Cl.
*H04N 9/80* (2006.01)
*H04N 5/76* (2006.01)
*H04N 5/93* (2006.01)
*H04N 5/445* (2011.01)
*H04N 5/783* (2006.01)
*H04N 7/16* (2011.01)
*H04N 7/173* (2011.01)
*G08B 1/08* (2006.01)
*G11B 5/02* (2006.01)
*H04H 60/09* (2008.01)

(52) U.S. Cl.
USPC ........... 386/241; 386/248; 386/257; 386/278; 386/295; 386/343; 386/350; 340/539.1; 340/539.11; 360/22; 455/3.04; 725/25; 725/30; 725/39; 725/44; 725/55; 725/58; 725/86; 725/87; 725/133; 725/141

(58) Field of Classification Search
USPC ................. 386/241, 248, 295, 343, E5.042, 386/E5.043, 257, 350, 278; 705/12, 26.64, 705/52, 53; 707/999.2, 999.203, E17.005, 707/999.008; 725/25, 30, 39, 55, 58, 133, 725/141, 44, 86, 87; 455/3.04, 186.1; 360/22; 340/539.1, 539.11; G9B/27.011, 21.012, 27.019, 27.02, G9B/27.049, 27.05
See application file for complete search history.

(56) References Cited

U.S. PATENT DOCUMENTS

| | | |
|---|---|---|
| 7,245,819 B1 | 7/2007 | Sanders ........................ 386/46 |
| 7,394,967 B1 * | 7/2008 | Potrebic et al. ............... 386/248 |

(Continued)

FOREIGN PATENT DOCUMENTS

| | | | |
|---|---|---|---|
| WO | WO2007/103154 A2 | 9/2007 | ............. H04N 7/173 |
| WO | WO2007/103154 A3 | 9/2007 | ............... H04N 5/91 |

(Continued)

*Primary Examiner* — Thai Tran
*Assistant Examiner* — Syed Hasan
(74) *Attorney, Agent, or Firm* — Mark C. Vallone, Esq.; Matthew M. Hulihan, Esq.; Heslin Rothenberg Farley & Mesiti P.C.

(57) ABSTRACT

A method and system for managing multiple user locks and deletion requests on a digital video recorder (DVR) is disclosed. Files associated with the DVR can be protected from deletion by allowing users to lock a recorded file utilizing a number of locking strategies. The recorded file can also be locked by multiple users and the recording can be deleted when the users specifically remove the lock. A simpler interface for each user can be provided to prevent other users from deleting recorded files, which have not yet been viewed. Such an approach allows for an administrative override to prevent users from locking recordings and never unlocking in order to prevent the DVR exhausting disk space.

20 Claims, 5 Drawing Sheets

(56) References Cited

U.S. PATENT DOCUMENTS

| | | | | |
|---|---|---|---|---|
| 7,739,153 | B1* | 6/2010 | Anderson et al. | 705/26.64 |
| 7,965,976 | B2* | 6/2011 | Takehara et al. | 455/3.04 |
| 2004/0019903 | A1* | 1/2004 | Knudson et al. | 725/30 |
| 2004/0146282 | A1 | 7/2004 | Lee | 386/95 |
| 2004/0244030 | A1 | 12/2004 | Boyce et al. | 725/25 |
| 2005/0050578 | A1 | 3/2005 | Ryal | 725/143 |
| 2005/0232610 | A1 | 10/2005 | Boger et al. | 386/125 |
| 2006/0176595 | A1* | 8/2006 | Nagata | 360/22 |
| 2007/0033232 | A1* | 2/2007 | Malloy | 707/200 |
| 2007/0098362 | A1* | 5/2007 | Sharma | 386/94 |
| 2007/0174356 | A1* | 7/2007 | Horii et al. | 707/203 |
| 2007/0300262 | A1 | 12/2007 | Kim | 725/58 |
| 2008/0262906 | A1* | 10/2008 | Pamell et al. | 705/12 |
| 2010/0086277 | A1* | 4/2010 | Craner | 386/52 |

FOREIGN PATENT DOCUMENTS

| | | | | |
|---|---|---|---|---|
| WO | WO2008/055221 A2 | 5/2008 | | H04N 7/26 |
| WO | WO2008/055221 A3 | 5/2008 | | H04N 7/173 |

* cited by examiner

MANAGING MULTIPLE USER LOCKS AND DELETION REQUESTS FOR A DIGITAL VIDEO RECORDER

TECHNICAL FIELD

Embodiments are generally related to digital play back systems. Embodiments are also related to methods and systems for managing multiple user locks and deletion requests with respect to digital play back systems.

BACKGROUND OF THE INVENTION

Digital playback devices and/or systems such as, for example, a DVR (Digital Video Recorder), have become increasingly popular with consumers. A DVR can be utilized to record video in a digital format to a disk drive or a storage medium. The term "DVR" also includes components such as stand-alone set-top boxes and software for personal computers which enable video capture and play back to and from a disk or other data storage device. A DVR provides several enhancements to similar devices, such as a VCR (Video Cassette Recorder), which includes convenient "time shifting" capabilities. Time shifting involves recording a program to a storage medium to be viewed or listened to at a time that is more convenient to the consumer. Additionally, a DVR enables "trick modes" such as, for example, pausing live TV, instant replay of interesting scenes, chasing playback and skipping of advertising. Most DVR devices utilize the MPEG (Moving Picture Experts Group) format for encoding analog video signals.

The majority of DVR systems can be accessed by multiple users in a shared user environment (e.g., family members). The recorded programs must be eventually deleted to make room for new programming. Unfortunately, such deletion in a shared user environment sometimes leads to a recording desired to be retained by one user, deleted by another user of the same DVR system. Current DVR systems do not allow DVR users to annotate recordings for protection against deletion by another user. Further, discussion and agreement between users is typically required in order to determine which recordings can be deleted and which recordings should be retained. Such an approach, however, is difficult to implement due to the inherent problems associated with multiple users utilizing the DVR at various times in a shared environment.

Some DVR systems have been designed with the capability of identifying multiple DVR users who have deleted content after one or more users previously viewed the same content. In some cases, however, a particular user may require that the file maintain recorded content for an extended period of time. Another DVR system automatically deletes the previously recorded programs from storage according to a protocol when there is insufficient storage space to record a program.

Other DVR systems maintain individual scene segments on the hard disk along with a database table. The database table may include viewer preference information such as viewed, skipped, or unviewed and starting/ending address information with respect to each scene segment. Further, upon reception of the user's request, the system may update the database table, which results in the availability of space on the hard disk. Thus, such a system allows the DVR to delete portions of a show, for example, before deleting the entire show, in an effort to competently utilize limited hard drive storage.

Such systems require, however, specifying in advance the number of users to complete viewing of a recording before it is scheduled for deletion. Such systems also require a user to grant access to other users and involve a complicated ratings process to determine which recordings are capable of being deleted. The configuration, access permissions, and deletion scheduling associated with such systems are complicated and time-consuming; hence, such systems may not be easily implemented in the context of a home DVR environment.

Based on the foregoing, it is believed that a need exists for an improved method and/or system for managing multiple user locks and deletion requests with respect to the DVR. A need also exists for a method for providing a simpler user interface and decision mechanism, which can be utilized to prevent users from deleting recordings until the recording is watched or needed.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved digital play back system.

It is another aspect of the present invention to provide for an improved method and system for managing multiple user locks and deletion requests with respect to a DVR.

It is a further aspect of the present invention to provide for an improved method and system for providing a simple user interface and decision mechanism that prevents users from deleting recordings until the recording is watched and/or needed.

The aforementioned aspects and other objectives and advantages can now be achieved as described herein. A method and system for managing multiple user locks and deletion requests with respect to a DVR is disclosed. Files associated with the DVR can be protected from deletion by allowing users to lock a recorded file utilizing a number of locking strategies. The recorded file can also be locked by multiple users and the recording can be deleted when a user specifically removes the lock. A simple interface for each user can be provided to prevent other users from deleting recorded files which have not yet been viewed. Such an approach allows for an administrative override to prevent users from locking recordings and/or unlocking in order to prevent the DVR from exhausting disk space.

The recording can be protected from deletion utilizing locking strategies such as, for example, lock by annotation, floating locks, committee deletion, deletion by percentage watched and deletion by program rating. The lock by annotation strategy annotates a recording as "Do Not Delete," in order to prevent users from deleting the recording. The floating lock strategy is based on hard locks and soft locks. The hard lock on a program can be given highest priority from deletion and the soft locks can be provided with a higher priority than programs with no locks. The committee deletion strategy marks items for deletion by each user as deletion votes. The system then deletes the items with the most number of deletion votes when the DVR space is exhausted. The recordings can also be deleted based on the percentage watched and program ratings. Additionally, an option can be provided to remove the lock at the end of the recording's playback, if the current user has placed a lock on the recording. In addition, the user can remove the lock through a standard options menu for a recording at any time. Once no locks remain for a recording, the recording can be deleted the next time any user selects the recording for deletion.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
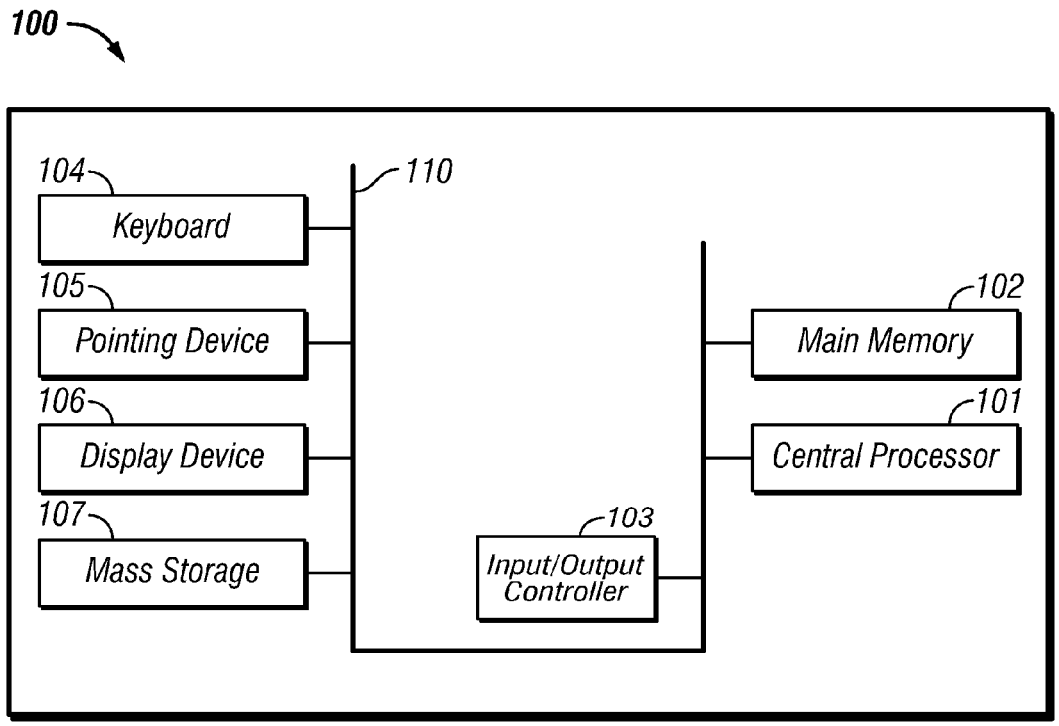
FIG. 1 illustrates a schematic view of a computer system in which the present invention may be embodied.
Figure 2:
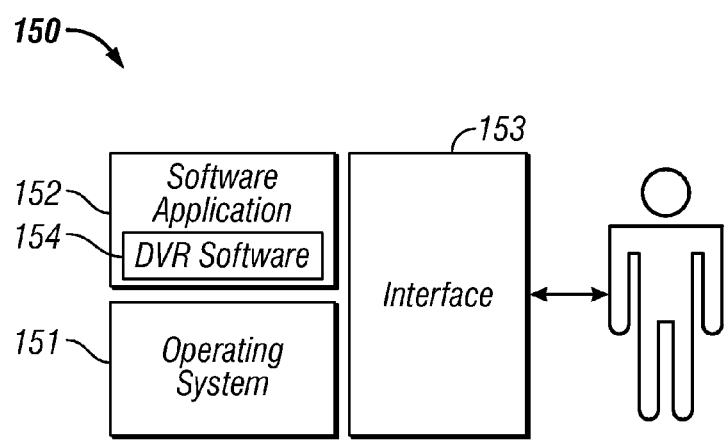
FIG. 2 illustrates a schematic view of a software system including an operating system, application software, and a user interface for carrying out the present invention.
Figure 3:
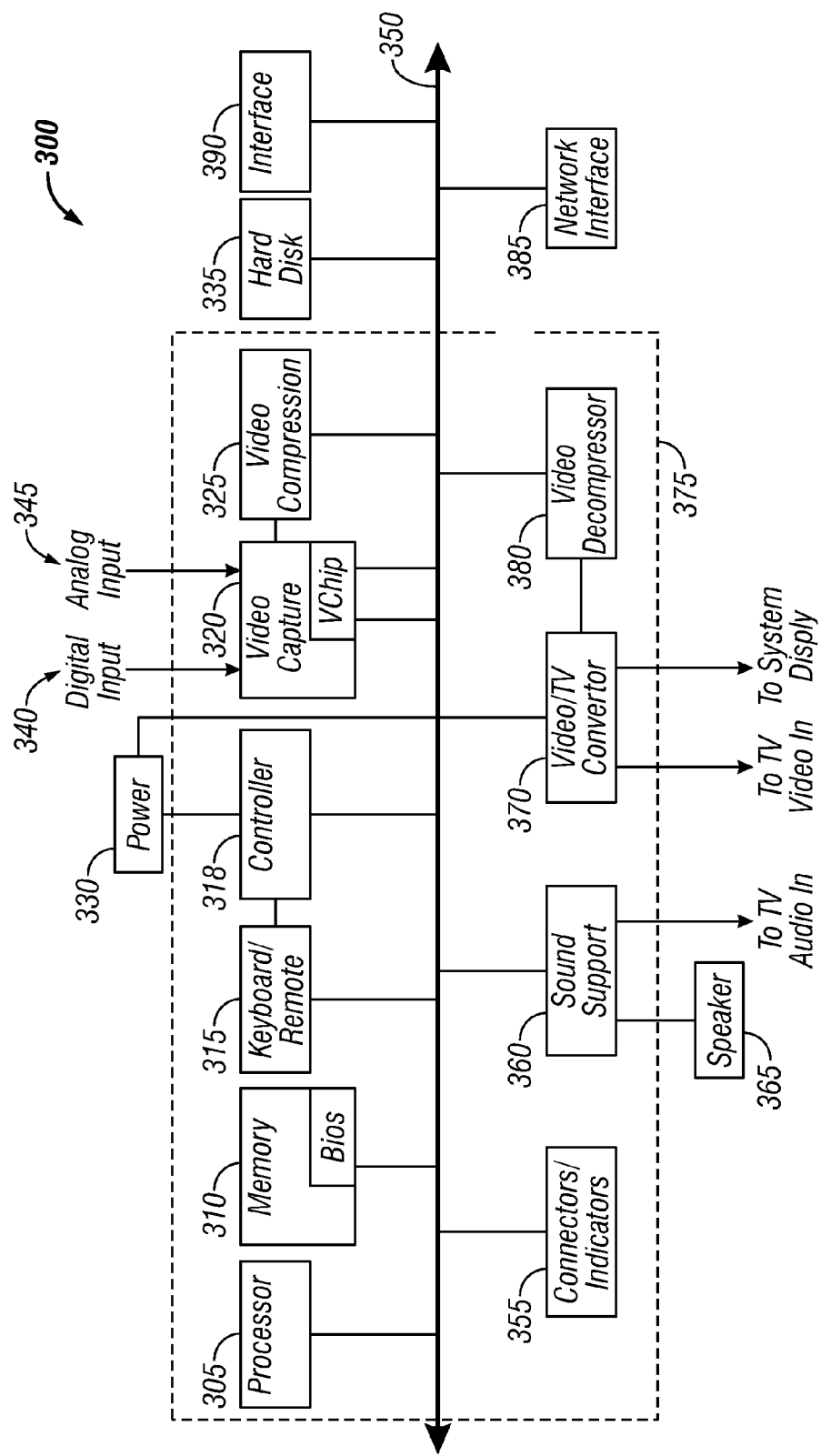
FIG. 3 illustrates a block diagram of a digital video recorder (DVR) system, which can be implemented in accordance with a preferred embodiment.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates that the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). As illustrated, the various components of the data-processing apparatus 100 communicate through a system bus 110 or similar architecture.

FIG. 2 illustrates a computer software system 150 provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153 is preferably a graphical user interface (GUI). In one possible embodiment, operating system 151 and interface 153 can be implemented in the context of a "Windows" system. Application module 152, on the other hand, can include instructions, such as the various operations described herein with respect to the various components and modules described herein, such as, for example, the method 400 depicted in FIG. 4. FIG. 2 is intended as an example and not as an architectural limitation for different embodiments of the present invention. The application module 152 can include, for example, digital video recording software—DVR software 154—for recording and complete monitoring control and exceptional access from the data-processing apparatus 100. The DVR application 154 provides for hard disk recording, which is easy to search and play back previous recordings.

The following description is presented with respect to embodiments of the present invention, which can be embodied in the context of a data-processing system such as data-processing apparatus 100 and computer software system 150, as depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like.

FIG. 3 illustrates a block diagram of a digital video recorder (DVR) system 300, which can be implemented in accordance with the preferred embodiment. The DVR system 300 records video in a digital format to a disk drive or other memory medium within a device which includes stand-alone set-top boxes, portable media players (PMP) and software for computer 100 which enables video capture and playback to and from disk. The DVR system 300 comprises a motherboard 375, which includes at least one processor 305 and a memory 310 connected to a system bus 350. The memory 310 includes read only memory (ROM) containing a basic input/output services (BIOS) routine and may include cache memory and/or video RAM. A Video/TV converter 370 on the motherboard 375 can be connected to the system bus 350, which generates computer video signals for computer monitors, a composite television signal, and an S-Video signal. The functionality of the video/TV converter 370 can be provided utilizing commercially available video and converter chips. A video decompression circuitry 380 decompresses video data before it is sent to the video/TV converter 370. A keyboard/remote control interface unit 315 on the motherboard 375 receives keyboard codes through a controller 318, regardless of whether a wired keyboard/pointing device or an infrared keyboard/remote control is being employed.

The connectors/indicators 355 on the motherboard 375 provide connections and indications on DVR system 300. The tuner/video capture circuitry 320 couples the DVR system 300 to a source of programming. For example, the tuner/video capture circuitry 320 may receive television signals, which may be digital or analog. The tuner/video capture circuitry 320 may receive digital signals, such as digital television or high definition (HD) television, via a digital interface 340 or analog signals via an analog interface 345. These signals are well known to those skilled in the art for programming provided from over-air television, cable television, and satellite television.

The DVR system 300 may be coupled via interfaces 345 or 340 to another device that serves as a program source, such as a digital video disk player, a videotape player, a compact disc player, an mp3 player, and the like. Additional known receivers, such as a receiver for satellite television, can also be implemented with the tuner/video capture circuitry 320, which separates the incoming television signals into audio signals and video signals. The video signals can be converted from analog to digital signals and then may be compressed via a video compression circuitry 325, which can be a moving pictures expert group (MPEG) compression circuitry. The tuner/video capture circuitry 320 may also include a V-chip or other type of screening circuitry.

The sound support 360 includes circuitry to convert audio signals from analog to digital and vice versa. The sound support 360 also includes circuitry to compress and decompress digital audio signals. Audio signals may be sent from the sound support 360 to a speaker 365 and/or the audio in connection of a television. External to the motherboard 375 in the depicted example are power supply 330, a hard disk 335, a network interface 385 and a GUI interface 390. External power supply 330 is a conventional power supply except that it receives a control signal from a controller 318 which effects shut down of all power to the motherboard 375, the hard drive 335, and network interface 385. The power supply 330, in response to a signal from the controller 318, is capable of powering down and restarting the DVR 300. The hard disk 335 includes operating system and applications software for the DVR system 300. Data, such as television program data, may also be stored on the hard disk 335.

A network interface 385 represent the hardware and software to allow DVR 300 to couple to a network, such as the telephone network, a local area network, a wide area network, or some other form of data network, such as the Internet. For example, the network interface 385 may be inserted into a slot mounted sideways on the motherboard 375. The network interface 385 may include other types of devices, such as an Ethernet interface, a wireless network interface, and the like. Accordingly, the DVR 300 may also receive programming from a source, such as a website, via the network interface 385. Controller 318 can be continuously powered and, when the DVR 300 is turned on, monitors the system for a periodic "ping" indicating that the DVR 300 is operating normally. In the event that the controller 318 does not receive a ping within a prescribed timeout period, the controller 318 removes power from the system and restarts the system, which may be necessary, for example, when the system experiences a general protection fault.

The controller 318 can also receive and process input from an infrared remote control, infrared keyboard, wired keyboard, wired mouse, and so forth. The DVR 300 may also be configured to track the viewing status of users and control the deletion of programs by other mechanisms. The DVR 300 or similar device may be configured to support multiple outputs to televisions, computer monitors, and the like.

Figure 4:
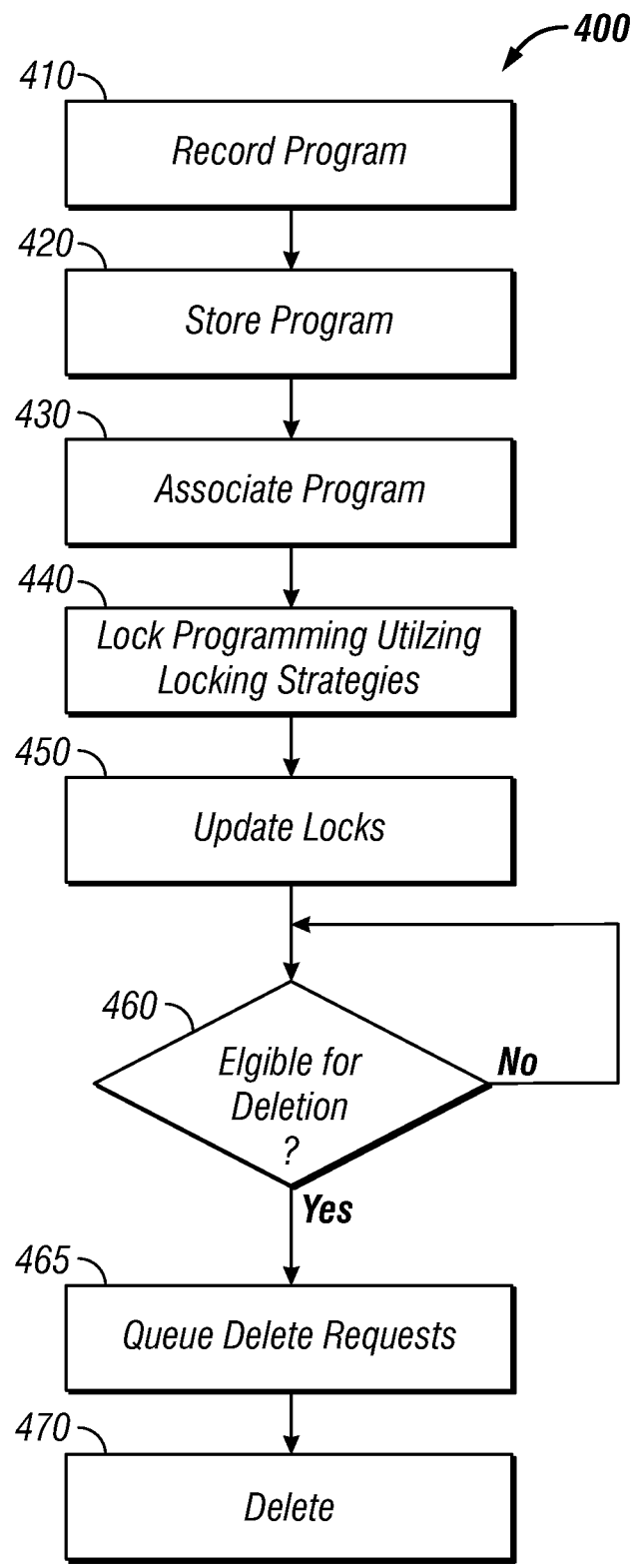
FIG. 4 illustrates a flow chart of operations illustrating logical operational steps of a method for scheduling deletion of a program from the digital video recorder (DVR), in accordance with a preferred embodiment.

FIG. 4 illustrates a flow chart of operations depicting a method 400 for scheduling the removal of a program from the DVR 300, in accordance with a preferred embodiment. Note that the method 400 can be implemented in the context of a computer-useable medium that contains a program product. A program can be recorded utilizing the DVR 300, as depicted at block 410. The DVR 300 may receive video from the video capture circuitry 320 and may receive the programming in various signals via interfaces 340 and 345. Thereafter, the recorded program can be stored, as depicted at block 420, as one or more files on the hard disk 335. Moreover, the DVR 300 can be coupled to another device such as an external disk drive or computer 100 with storage capacity. The stored program can then be associated with users, as shown at block 430. The DVR 300 may then select one or more users that are likely to be interested in viewing the recorded program. Subsequently the recording can be locked utilizing various locking strategies 500, as illustrated at block 440.

Figure 5:
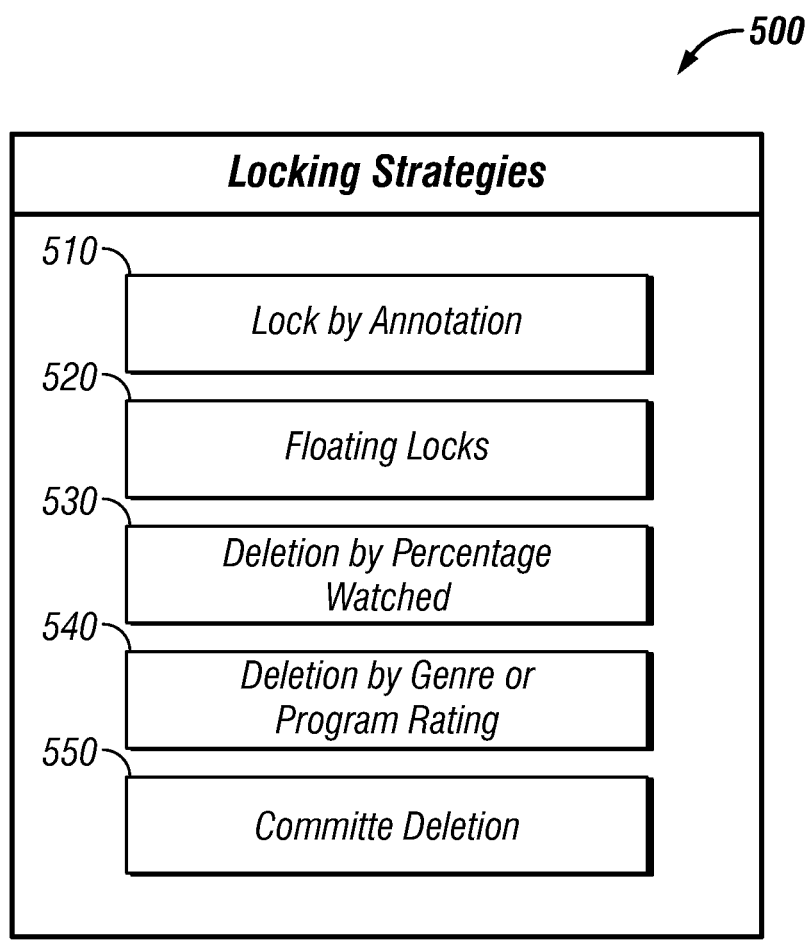
FIG. 5 illustrates a block diagram depicting various locking strategies for locking a recorded programming, in accordance with a preferred embodiment.

FIG. 5 illustrates a block diagram 500 depicting various locking strategies for locking a recorded programming, in accordance with a preferred embodiment. The block diagram 500 includes locking strategies such as lock by annotating 510, floating locks 520, deletion by percentage watched 530, deletion by genre or program rating 540, and committee deletion 550. The lock by annotating strategy 510 annotates a recording as "Do Not Delete," upon completion of viewing a recording, which can prevent users from deleting the recording.

For example, in the lock by annotating strategy 510, a user can select an option to annotate the recording as having been watched by the user, which effectively removes the "Do Not Delete" annotation upon completion of viewing a recording. The recording can be marked by the DVR system 300 as a deletion candidate when all users who have specified the "Do Not Delete" option for the recorded show have removed the annotation. In the preferred embodiment the DVR 300 can possess the capability to manage multiple users and each user can be required to authenticate to indicate the current user to the DVR 300. The DVR 300 for recorded content can have an option for the currently authenticated user to annotate a recording as "Do Not Delete" effectively locking the recording. A recording can be annotated after the recording is complete, or may be set as one of the recording options.

Similarly, in the floating locking strategy 520 each user can be given a specified number of locks to apply to the recorded program. The recorded program may comprise a hard lock or a soft lock. The hard lock on the recorded program can prevent the deletion of the recorded program. The soft lock can request that other programs without soft locks be deleted first. If multiple users have a soft lock on the same program, that program can be deleted after other programs with a single soft lock. The hard lock on a program can be given highest priority from deleting, whereas soft locks can be given higher priority than programs with no locks. In most embodiments, the number of hard locks for each user can be limited and as new hard locks are applied the oldest hard lock can be removed.

In the deletion by percentage-watched strategy 530, if a percentage of a show has been watched (e.g., 70%) the item can be deleted only after shows which have not been watched at all. Such a system retains recordings in which the user has already watched a portion of the recording and is thus invested in completing the program. The deletion by percentage-watched strategy 530 is unlikely to be independent and is more useful as a method to select among a plurality of programs for possible deletion.

In the deletion by genre or program rating strategy 540, the users of the DVR 300 can rate individual programs and such rating can be utilized to indicate genre preferences. Programs with higher aggregate ratings and within higher rated genres can be retained longer than programs with lower ratings. Such strategy is unlikely to be independent and is more useful as a method to select among a plurality of programs for possible deletion.

In the committee deletion locking strategy 550, each user marks items for deletion. Each deletion annotation can be considered a deletion "vote". Similarly, each user can only annotate a program once per program and the DVR system 300 deletes items with the most number of deletion votes when the space of the DVR 300 is exhausted. Note that the committee deletion locking strategy 550 can include the ability for one user to have more weight or clout than other users. For example, if user 1 votes to delete a program, that vote can be weighed with a value that is two-times more than that of a vote from user 2.

The locks can be updated, as shown at block 450. A determination can then be made whether the program is eligible for deletion, as illustrated at block 460. If a recording possesses a lock on the DVR GUI interface 390, any attempt to delete the recording through the DVR GUI interface 390 can generate a message to the screen informing the current user of the lock and which users have set the lock. For example, if the current user is an administrator, an additional option to override these locks can be presented. At some point after a user has placed a lock on a recording, the recording can be watched. At the end of the recording, if the current user has placed a lock on the recording, the user may be presented an option to remove the lock.

The user may decide whether he or she desires to watch the recording again and not to remove the lock, or the user can remove the lock at this point. In addition, the user may remove the lock through the standard options menu for a recording at any time. Once a recording has no locks remaining, it can be deleted the next time a user selects the recording for deletion. If the recorded program is eligible for deletion, then the system can queue up delete requests, as depicted at block 465. For example, consider a scenario where someone desires to delete a program, but that particular program possesses a lock. Once these locks are removed, then the DVR can allow for an automatic deletion, because a user had previously specified that a deletion of the program should occur. The viewing user can also be prompted with an indication that in the past, another user (or the present user) has previously specified that a particular show be deleted. Once the locks associated with that particular show have been removed, the present user can be prompted to delete the file per another user's request. Actual programs can then be deleted, as indicated at block 470.

Note that the present invention may be implemented in the context of a system having hardware, software, or a combination of software and hardware as described herein or their equivalent. Thus, the method for scheduling the removal of a program from the DVR described herein can be deployed as process software in the context of a computer system or data-processing system such as that depicted in FIGS. 1-2.

Figure 6:
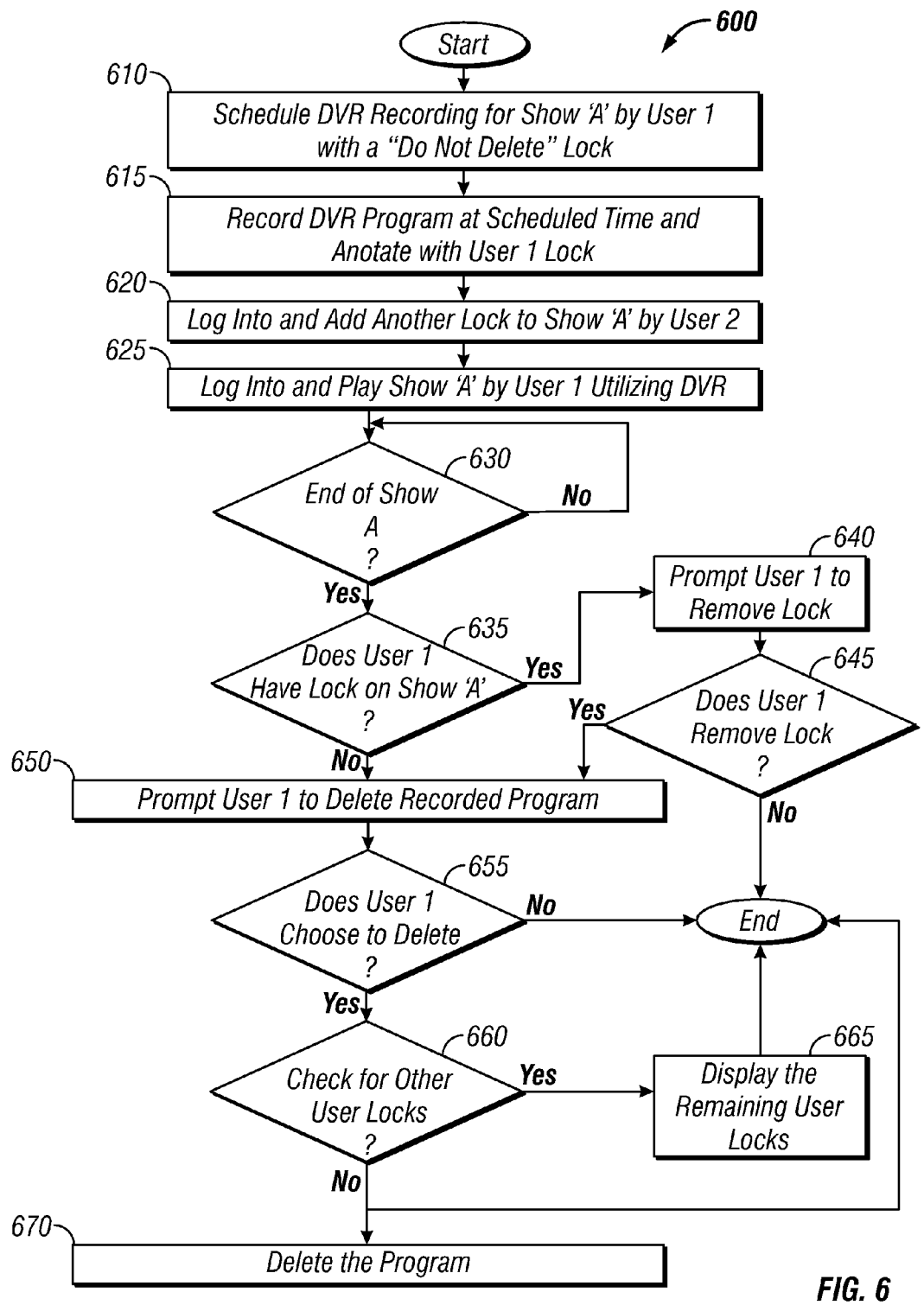
FIG. 6 illustrates a detailed flow chart of operations illustrating logical operational steps of a method for managing multiple user locks and deletion requests on the digital video recorder, in accordance with an exemplary embodiment.

FIG. 6 illustrates a detailed flow chart of operations illustrating logical operational steps of a method 600 for managing multiple user locks and deletion requests on the DVR 300, in accordance with an exemplary embodiment. The DVR recording can be scheduled for show "A" by user 1 with a "Do Not Delete" lock, as illustrated at block 610. The program can be recorded at the scheduled time and the program can be annotated with a lock, as depicted at block 615. Next, user 2 can log in and can add another lock to show "A", as shown at block 620. Subsequently, user 1 can login for a second time and play the recorded program show "A", as illustrated at block 625.

Thereafter, a determination can be made whether show "A" recording has been reached to an end, as depicted at block 630. If show "A" recording has reached the end, the lock of user 1 on show "A" can be checked, as shown at block 635. Otherwise, the process can be repeated to step 630 till the end of show "A". Next, if the lock of the user 1 is found, then user 1 can be prompted to remove the lock, as illustrated at block 640. A determination can be made to check whether user 1 has removed the lock, as depicted at block 645. If user 1 removes the lock, then user 1 can be prompted to delete the recording, as shown at block 650. Otherwise, the process can be ended. Thereafter, a determination can be made whether user 1 has chosen to delete the recording, as depicted at block 655. If user 1 chooses to delete the recording, then other user locks can be checked, as illustrated at block 660. If other locks are found, the remaining locks can be displayed, as depicted at block 665 and the process can be ended. Otherwise, specifically if no locks are found then the program can be deleted, as shown at block 670 and the process may be ended.

Once a recording has the lock on it, any attempt to delete such recording through the DVR GUI interface 390 can generate a message to the screen informing the current user of the lock and which users have set the lock. Note that the term "GUI" as utilized herein generally refers to a type of environment that represents programs, files, options and so forth by means of graphically displayed icons, menus, and dialog boxes on a computer monitor screen. The user can interact with the GUI to select and activate the options by pointing and clicking with a user input device such as, for example, a pointing device such as a mouse, and/or with a keyboard.

Next, to some point after the user has placed the lock on the recording, the recording can be watched. At the end of the recording, if the current user has placed the lock, the user may be presented an option to remove the lock. The user may remove the lock through the standard options menu for a recording at any time. Formerly, if the recording has no locks remaining, the recording can be deleted subsequently when any user selects the recording for deletion. It is believed that by utilizing the DVR system 300 and method 400 described herein, multiple user locks and deletion requests can be managed efficiently by utilizing the locking strategies, as illustrated in FIG. 5.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for managing lock and deletion requests with respect to a digital playback device, the method comprising:
at least one processor receiving from a first user, via a user interface of the digital playback device a request to place a lock on a recorded program for the first user of multiple users of the digital playback device, the recorded program having been recorded by the digital playback device;
responsive to receiving the request to place the lock on the recorded program for the first user, said at least one processor placing the lock for the first user on the recorded program, the lock for the first user preventing deletion of the recorded program while placed on the recorded program;

said at least one processor receiving from a second user, via the user interface of the digital playback device, a request to place a lock on the recorded program for the second user of the multiple users;

responsive to receiving the request to place the lock on the recorded program for the second user, said at least one processor placing the lock for the second user on the recorded program, the lock for the second user preventing deletion of the recorded program while placed on the recorded program, wherein the lock for the second user is a separate lock from the lock for the first user, and wherein the recorded program is accessible for viewing by the first user and the second user while the lock for the first user and the lock for the second user are placed on the recorded program;

said at least one processor receiving a request to remove the lock for the first user and, in response, said at least one processor removing the lock for the first user from the recorded program;

after said at least one processor removing the lock for the first user from the recorded program, said at least one processor receiving, via the user interface of the digital playback device, a request by the first user to delete the recorded program from the digital playback device while the lock for the second user is placed on the recorded program, and in response, said at least one processor preventing deletion of the recorded program;

said at least one processor receiving a request to remove the lock for the second user and, in response, said at least one processor removing the lock for the second user from the recorded program; and after the at least one processor removing the lock for the second user from the recorded program, said at least one processor receiving a request to delete the recorded program from the digital playback device, and in response, said at least one processor deleting the recorded program from the digital playback device, thereby protecting said recorded program from being deleted without agreement among said first user and said second user.

2. The method of claim 1 further comprising:
said at least one processor allowing said first user to authenticate with the digital playback device as a currently authenticated user of the digital playback device, wherein the first user provides the lock request for the first user to the digital playback device responsive to authenticating as the currently authenticated user of the digital playback device, and wherein said first user utilizes said user interface to annotate said recorded program with a viewable alert that warns other users of the digital playback device not to delete said recorded program.

3. The method of claim 1, wherein at least one of the placing the lock for the first user and the placing the lock for the second user utilizes a floating lock strategy based on a hard lock and a soft lock, wherein said hard lock is given a highest priority in preventing a deletion of a recorded program, wherein said soft lock is given a lower priority than said hard lock in preventing a deletion of said recorded program, wherein said soft lock is given a higher priority than unlocked programs in preventing a deletion of said recorded program, and wherein a condition for deletion of the recorded program from the digital playback device is based on a number of hard locks and a number of soft locks associated with the recorded program.

4. The method of claim 1 wherein a condition for deletion of the recorded program from the digital playback device comprises having a highest number of deletion votes among other recorded programs of the digital playback device, and wherein the deleting said recorded program comprises:
said at least one processor marking said recorded program for deletion to form a deletion vote, and deleting said recorded program when a disk space associated with said digital playback device is exhausted and based on said recorded program having a highest number of deletion votes among the other recorded programs recorded by the digital playback device.

5. The method of claim 1 wherein a condition for deletion of the recorded program from the digital playback device comprises a particular percentage of the recorded program having been watched, and wherein the deleting said recorded program comprises deleting said recorded program based on the particular percentage of said recorded program having been watched.

6. The method of claim 1 wherein a condition for deletion of the recorded program from the digital playback device is based on a rating of the recorded program, and wherein the deleting said recorded program comprises deleting said recorded program based on the rating, wherein recorded programs with higher aggregate ratings and within higher rated genres are retained longer than recorded programs with lower ratings.

7. The method of claim 1 further comprising said at least one processor providing an administrative override that prevents said first user and said second user from locking said recorded program and never unlocking said recorded program, in order to prevent an exhaustion of disk space associated with said digital playback device.

8. A computer system comprising:
at least one processor;
a memory coupled to the at least one processor; and
a computer-usable storage device coupled to the processor and storing instructions that, when carried out by the at least one processor via the memory, implement a method for managing lock and deletion requests with respect to a digital playback device, the method comprising:
the at least one processor receiving from a first user, via a user interface of the digital playback device, a request to place a lock on a recorded program for the first user of multiple users of the digital playback device, the recorded program having been recorded by the digital playback device;
responsive to receiving the request to place the lock on the recorded program for the first user, said at least one processor placing the lock for the first user on the recorded program, the lock for the first user preventing deletion of the recorded program while placed on the recorded program;
said at least one processor receiving from a second user, via the user interface of the digital playback device, a request to place a lock on the recorded program for the second user of the multiple users;
responsive to receiving the request to place the lock on the recorded program for the second user, said at least one processor placing the lock for the second user on the recorded program, the lock for the second user preventing deletion of the recorded program while placed on the recorded program, wherein the lock for the second user is a separate lock from the lock for the first user, and wherein the recorded program is accessible for viewing by the first user and the second user while the lock for the first user and the lock for the second user are paced on the recorded program;

said at least one processor receiving a request to remove the lock for the first user and in response, said at least one processor removing the lock for the first user from the recorded program;

after said at least one processor removing the lock for the first user from the recorded program, said at least one processor receiving, via the user interface of the digital playback device, a request by the first user to delete the recorded program from the digital playback device while the lock for the second user is placed on the recorded program, and in response, said at least one processor preventing deletion of the recorded program;

said at least one processor receiving a request to remove the lock for the second user and, in response, said at least one processor removing the lock for the second user from the recorded program;

after said at least one processor removing the lock for the second user from the recorded program, said at least one processor receiving a request to delete the recorded program from the digital playback device, and in response, said at least one processor deleting the recorded program from the digital playback device, thereby protecting said recorded program from being deleted without agreement among said first user and said second user.

9. The computer system of claim 8 wherein the method further comprises:

the at least one processor allowing said first user to authenticate with the digital playback device as a currently authenticated user of the digital playback device, wherein the first user provides the lock request for the first user to the digital playback device responsive to authenticating as the currently authenticated user of the digital playback device, and wherein said first user utilizes said user interface to annotate said recorded program with a viewable alert that warns other users of the digital playback device not to delete said recorded program.

10. The computer system of claim 8 wherein at least one of the placing the lock for the first user and the placing the lock for the second user utilizes a floating lock strategy based on a hard lock and a soft lock, wherein said hard lock is given a highest priority in preventing a deletion of a recorded program, and wherein said soft lock is given a lower priority than said hard lock in preventing a deletion of said recorded program, wherein said soft lock is given a higher priority than unlocked programs in preventing a deletion of said recorded program, and wherein a condition for deletion of the recorded program from the digital playback device is based on a number of hard locks and a number of soft locks associated with the recorded program.

11. The computer system of claim 8 wherein a condition for deletion of the recorded program from the digital playback device comprises having a highest number of deletion votes among other recorded programs of the digital playback device, and wherein the deleting said recorded program comprises:

the at least one processor marking said recorded program for deletion to form a deletion vote, and deleting said recorded program when a disk space associated with said digital playback device is exhausted and based on said recorded program having a highest number of deletion votes among the other recorded programs recorded by the digital playback device.

12. The computer system of claim 8, wherein a condition for deletion of the recorded program from the digital playback device comprises a particular percentage of the recorded program having been watched, and wherein the deleting said recorded program comprises deleting said recorded program based on the particular percentage of said recorded program having been watched.

13. The computer system of claim 8 wherein a condition for deletion is based on a rating of the recorded program, and wherein the deleting said recorded program comprises deleting said recorded program based on the rating, wherein recorded programs with higher aggregate ratings and within higher rated genres are retained longer than recorded programs with lower ratings.

14. The computer system of claim 8 wherein the method further comprises:

the at least one processor providing an administrative override that prevents said first user and said second user from locking said recorded program and never unlocking said recorded program, in order to prevent an exhaustion of disk space associated with said digital playback device.

15. A computer-usable tangible storage device storing computer program code, said computer program code comprising instructions executable by at least one processor to perform a method for managing lock and deletion requests with respect to a digital playback device, the method comprising:

the at least one processor receiving from a first user, via a user interface of the digital playback device, a request to place a lock on recorded program for the first user of multiple users of the digital playback device, the recorded program recorded by the digital playback device;

responsive to receiving the request to place the lock on the recorded program for the first user, said at least one processor placing the lock for the first user on the recorded program, the lock for the first user preventing deletion of the recorded program while placed on the recorded program;

said at least one processor, receiving from a second user, via the user interface of the digital playback device, a request to place a lock on the recorded program for the second user of the multiple users;

responsive to receiving the request to place the lock on the recorded program for the second user, said at least one processor placing the lock for the second user on the recorded program, the lock for the second user preventing deletion of the recorded program while placed on the recorded program, wherein the lock for the second user is a separate lock from the lock for the first user, and wherein the recorded program is accessible for viewing by the first user and the second user while the lock for the first user and the lock for the second user are placed on the recorded program;

said at least one processor receiving a request to remove the lock for the first user and in response, said at least one processor removing the lock for the first user from the recorded program;

after said at least one processor removing the lock for the first user from the recorded program, said at least one processor receiving, via the user interface of the digital playback device, a request by the first user to delete the recorded program from the digital playback device while the lock for the second user is placed on the recorded program, and in response, said at least one processor preventing deletion of the recorded program;

said at least one processor receiving a request to remove the lock for the second user and, in response, said at least one processor removing the lock for the second user from the recorded program; and after said at least one processor removing the lock for the second user from the recorded program, said at least one processor receiving a request to delete the recorded program from the digital playback device, and in response, said at least one processor deleting the recorded program from the digital playback device, thereby protecting said recorded program from being deleted without agreement among said first user and said second user.

16. The computer-usable tangible storage device of claim 15, wherein the method further comprises:

the at least one processor allowing said first user to authenticate with the digital playback device as a currently authenticated user of the digital playback device, wherein the first user provides the lock request for the first user to the digital playback device responsive to authenticating as the currently authenticated user of the digital playback device, and wherein said first user utilizes said user interface to annotate said recorded program with a viewable alert that warns other users of the digital playback device not to delete said recorded program.

17. The computer-usable tangible storage device of claim 15, wherein at least one of the placing the lock for the first user or the placing the lock for the second user utilizes a floating lock strategy based on a hard lock and a soft lock, wherein said hard lock is given a highest priority in preventing a deletion of a recorded program, and wherein said soft lock is given a lower priority than said hard lock in preventing a deletion of said recorded program, wherein said soft lock is given a higher priority than unlocked in preventing a deletion of said recorded program, and wherein a condition for deletion of the recorded program from the digital playback device is based on a number of hard locks and a number of soft locks associated with the recorded program.

18. The computer-usable tangible storage device of claim 15, wherein a condition for deletion of the recorded program from the digital playback device comprises having a highest number of deletion votes among other recorded programs of the digital playback device, and wherein the deleting said recorded program comprises:

the at least one processor marking said recorded program for deletion to form a deletion vote, and deleting said recorded program when a disk space associated with said digital playback device is exhausted and based on said recorded program having a highest number of deletion votes among other recorded programs recorded by the digital playback device.

19. The computer-usable tangible storage device of claim 15, wherein a condition for deletion of the recorded program from the digital playback device comprises a particular percentage of the recorded program having been watched, and wherein the deleting said recorded program comprises deleting said recorded program based on the particular percentage of said recorded program having been watched.

20. The computer-usable tangible storage device of claim 15, wherein the method comprises:

the at least one processor providing an administrative override that prevents said first user and said second user from locking said recorded program and never unlocking said recorded program, in order to prevent an exhaustion of disk space associated with said digital playback device.

* * * * *